UNITED STATES PATENT OFFICE.

ALBERT HESSE, OF BERLIN, GERMANY, ASSIGNOR TO CHEMISCHE FABRIKAUF ACTIEN, (VORM. E. SCHERING,) OF BERLIN, GERMANY.

PROCESS OF MAKING BORNEOL.

No. 826,165.  Specification of Letters Patent.  Patented July 17, 1906.

Application filed November 4, 1905. Serial No. 285,870.

*To all whom it may concern:*

Be it known that I, ALBERT HESSE, doctor of philosophy, chemist, a subject of the German Emperor, residing at Berlin, Kingdom of Prussia, German Empire, have invented a new and useful Improvement in the Manufacture of Borneol, of which the following is a specification.

I have found that the magnesium compounds of the hydrohaloids of pinene (pinene hydrochlorid, pinene hydrobromid, pinene hydroiodid) absorb oxygen very readily and are then transformed into complex magnesium compounds, which when decomposed by dilute acids form borneol.

The magnesium compounds of the hydrohaloids of pinene are best produced in the manner described in my application for "Improvements in the manufacture of organic magnesium compounds." According to this application a solution of the pinene hydrohaloid is caused to react upon magnesium in the presence of a catalytic reagent—for example, a suitable organic halogen compound, such as methyliodid, ethyliodid, ethylbromid, benzene bromid, benzene iodid, benzylchorid, bornyliodid, and the like. Preferably an ethereal solution of the said alkyl or aryl halogen compounds is first allowed to react upon magnesium and then a solution of the pinene hydrohaloid is added to the mixture.

To manufacture borneol, for instance, from pinene hydrochlorid, which is the cheapest starting material, I proceed as follows: 0.2 kilogram of ethylbromid dissolved in 0.8 kilogram of dry ether is poured over 1.4 kilograms of magnesium. After stirring for a short time an energetic reaction takes place. Before the reaction is complete a solution of ten kilograms of pinene hydrochlorid in six kilograms of dry ether is gradually allowed to flow into the mixture, which is kept in continuous movement. The addition of the solution can be so regulated that a quiet boiling ensues. When the reaction is complete—*i. e.*, when the magnesium compound of the pinene hydrochlorid has been formed—oxygen or a gas containing oxygen, such as atmospheric air, is passed through the mixture until oxygen is no longer absorbed, the vessel in which the reaction takes place being cooled with water. Upon the addition of ice and dilute acids until a slightly-acid reaction is given the product of the reaction separates into two layers. The lower aqueous layer is drained off. The ethereal layer, which is neutralized if it has an acid reaction, is then dried and freed from ether by distillation. The product thus obtained, which is crude borneol, is purified by recrystallization from a suitable solvent—such as petroleum-ether, alcohol, benzene—or separated from the impurities by transformation into its phthalic-acid ester. In this way the magnesium compounds of the hydrohaloids of pinene are nearly quantitatively transformed into borneol.

In referring in the claims to "oxygen" I desire to embrace not only substantially pure oxygen, but also suitable gases which contain oxygen—for instance, air.

I claim as my invention—

1. The process of manufacturing borneol, which consists in causing oxygen to react upon the magnesium compounds of pinene hydrohaloids, decomposing the resulting complex magnesium compounds by dilute acids, and isolating the formed borneol, substantially as set forth.

2. The process of manufacturing borneol, which consists in causing oxygen to react upon the magnesium compound of pinene hydrochlorid, decomposing the resulting complex magnesium compound by dilute acids, and isolating the formed borneol, substantially as set forth.

3. The process of manufacturing borneol, which consists in causing a solution of a pinene hydrohaloid to react upon magnesium in the presence of a catalytic reagent, passing oxygen through the magnesium compound thus produced, decomposing the oxidized magnesium compound by dilute acids, and isolating the formed borneol, substantially as set forth.

4. The process of manufacturing borneol, which consists in causing an ethereal solution of a suitable organic halogen compound to react upon magnesium, then adding a solution of pinene hydrochlorid to the mixture, passing oxygen through the magnesium compound of pinene hydrochlorid thus produced, decomposing the oxidized magnesium compound by dilute acids, and isolating the formed borneol, substantially as set forth.

In testimony whereof I have signed my name to this specification in the presence of two subscribing witnesses.

ALBERT HESSE.

Witnesses:
HENRY HASPER,
WOLDEMAR HAUPT.